United States Patent
Che et al.

(10) Patent No.: US 8,737,346 B2
(45) Date of Patent: May 27, 2014

(54) PHYSICAL UPLINK CONTROL CHANNEL ACK/NACK INDEXING

(75) Inventors: Xiang Guang Che, Beijing (CN); Esa Tiirola, Kempele (FI); Frank Frederiksen, Klarup (DK); Troels Kolding, Klarup (DK)

(73) Assignee: Nokia Corporation, Espoo (FI)

( * ) Notice: Subject to any disclaimer, the term of this patent is extended or adjusted under 35 U.S.C. 154(b) by 660 days.

(21) Appl. No.: 13/001,429

(22) PCT Filed: Jun. 25, 2009

(86) PCT No.: PCT/IB2009/006061
§ 371 (c)(1),
(2), (4) Date: Apr. 14, 2011

(87) PCT Pub. No.: WO2009/156838
PCT Pub. Date: Dec. 30, 2009

(65) Prior Publication Data
US 2011/0268053 A1    Nov. 3, 2011

Related U.S. Application Data

(60) Provisional application No. 61/133,222, filed on Jun. 25, 2008.

(51) Int. Cl.
*H04W 4/00*    (2009.01)

(52) U.S. Cl.
USPC ........................... 370/330; 370/468; 370/478

(58) Field of Classification Search
None
See application file for complete search history.

(56) References Cited

U.S. PATENT DOCUMENTS

| | | | | |
|---|---|---|---|---|
| 8,031,688 | B2 * | 10/2011 | Papasakellariou et al. | ... 370/344 |
| 2008/0253318 | A1 * | 10/2008 | Malladi et al. | ............... 370/328 |
| 2008/0305745 | A1 * | 12/2008 | Zhang et al. | .............. 455/67.11 |
| 2008/0311919 | A1 * | 12/2008 | Whinnett et al. | ............ 455/447 |
| 2009/0010240 | A1 * | 1/2009 | Papasakellariou et al. | ... 370/344 |
| 2009/0073955 | A1 * | 3/2009 | Malladi | ........................ 370/349 |
| 2009/0103482 | A1 * | 4/2009 | Imamura et al. | ............. 370/329 |
| 2009/0181712 | A1 * | 7/2009 | Xu | ................................ 455/522 |

FOREIGN PATENT DOCUMENTS

| | | |
|---|---|---|
| EP | 1278388 A2 | 1/2003 |
| WO | 2006123275 A1 | 11/2006 |

OTHER PUBLICATIONS

International Search Report and Written Opinion received in corresponding Patent Cooperation Treaty Application No. PCT/IB2009/006061, Nov. 25, 2009, 14 pages.
Ericsson, "Details of ACK/NACK Bundling for TDD", R1-081566, TSG-RAN WG1 #52bis, Mar. 31-Apr. 4, 2008, 4 pages.

(Continued)

*Primary Examiner* — Bob Phunkulh
(74) *Attorney, Agent, or Firm* — Harrington & Smith

(57) ABSTRACT

A method for controlling channel signaling between a UE and a wireless network access node is described. The method includes determining whether an examined sub-frame of a plurality of sub-frames in a first resource region is unused. The index of the examined sub-frame is a last index of the plurality of sub-frames allocated for use in a first channel. The plurality of sub-frames is organized in a reverse indexing manner such that a last indexed sub-frame is adjacent to a second resource region. The second resource region is allocated to a second channel. In response to determining that the examined sub-frame is unused, the examined sub-frame is re-allocated for temporary use in the second channel. The method also includes providing an indication of the allocation. Apparatus and computer readable media are also described.

17 Claims, 4 Drawing Sheets

(56) References Cited

OTHER PUBLICATIONS

Lin, Hwa-Chun, et al., "Reducing Packet Delay in Single-Hop WDM Networks Using Fixed Transceiver Array and Adaptive Channel Allocation", Journal of Lightwave Technology, vol. 24, No. 12, Dec. 2006, pp. 4925-4935.
Ericsson, et al. "Multiple ACK/NAK for TDD", R1-081110, TSG-RAN WG1 #52, Feb. 11-15, 2008, 1 page.
Motorola, et al., "ACK/NACK Bundling for TDD: Way Forward", R1-082168, 3GPP TSG-RAN1, May 5-9, 2008, 5 pages.
Motorola, et al., "ACK/NAK Building Bundling for TDD: Way Forward", R082100, 3GPP TSG-RAN1, May 5-9, 2008, 6 pages.
Motorola, "UL ACK/NACK Procedure for TDD", R082243, 3GPP TSG-RAN1 Meeting #53, May 5-9, 2008, 4 pages.
3GPP TS 36.300 V8.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2008; whole document (126 pages).
3GPP TS 36.211 V8.2.0; "3rd Generation Partnership Project; Technical Specification Group Radio Access Network; Evolved Universal Terrestrial Radio Access (E-UTRA); Physical Channels and Modulation (Release 8)"; Mar. 2008; whole document (65 pages).
3GPP TS 36.213 V8.3.0; "3rd Generation Partnership Project; Technical Specification Group Radio Access Network; Evolved Universal Terrestrial Radio Access (E-UTRA); Physical layer procedures (Release 8)"; May 2008; whole document (45 pages).
LG Electronics; "CCE to bundled ACK/NACK index mapping in TDD"; 3GPP TSG RAN WG1#53, R1-081816; May 5-9, 2008; Kansas City, MO, USA; whole document (3 pages).
Huawei; "Uplink ACK/NACK implicit mapping in TDD"; 3GPP TSG RAN WG1 Meeting #53, R1-081788; May 5-9, 2008; Kansas City, MO, USA; whole document (3 pages).
Nokia Siemens Networks et al.; "ACK/NACK Bundling Details for LTE TDD"; 3GPP TSG RAN WG1 Meeting #53, R1-081858; Kansas City, MO, USA; May 5-9, 2008; whole document (9 pages).
Nokia et al.; "On the PUCCH overhead associated with CCE index mapping"; 3GPP TSG RAN WG1 Meeting #53, R1-081851; Kansas City, MO, USA; May 5-9, 2008; whole document (2 pages).
Nokia et al.; "Downlink scheduling for ACK/NACK bundling"; 3GPP TSG RAN WG1 Meeting #52bis, R1-081452; Shenzhen, China; Mar. 31-Apr. 4, 2008; whole document (2 pages).
Nokia et al.; "General on PDCCH DL/UL grant of TDD"; 3GPP TSG RAN WG1 Meeting #51bis, R1-081451; Shenzhen, China; Mar. 31-Apr. 4, 2008; whole document (1 page).

* cited by examiner

PHYSICAL UPLINK CONTROL CHANNEL ACK/NACK INDEXING

RELATED APPLICATION

This application was originally filed as PCT Application No. PCT/IB2009/006061 on Jun. 25, 2009 and claims priority to U.S. Provisional Application No. 61/133,222 filed on Jun. 25, 2008, which is incorporated herein by reference in its entirety.

TECHNICAL FIELD

The exemplary and non-limiting embodiments of this invention relate generally to wireless communication systems, methods, devices and computer programs and, more specifically, relate to control channel signaling between a mobile user device and a wireless network access node.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various abbreviations that may appear in the specification and/or in the drawing figures are defined as follows:
 3GPP third generation partnership project
 ACK acknowledge
 AN ACK/NACK
 CCE control channel element
 CQI channel quality indicator
 DAI downlink activity indicator
 DL downlink (eNB towards UE)
 eNB EUTRAN Node B (evolved Node B)
 EPC evolved packet core
 EUTRAN evolved UTRAN (LTE)
 FDD frequency division duplex
 FDMA frequency division multiple access
 HARQ hybrid automatic repeat request
 LTE long term evolution
 MAC medium access control
 MM mobility management
 MME mobility management entity
 NACK not (negative) acknowledge
 Node B base station
 O&M operations and maintenance
 OFDMA orthogonal frequency division multiple access
 PCFICH physical control format indicator channel
 PDCP packet data convergence protocol
 PHY physical
 PRB physical resource block (180 kHz)
 PUCCH physical uplink control channel
 PUSCH physical uplink shared channel
 RB resource block
 RLC radio link control
 RRC radio resource control
 RRM radio resource management
 SC-FDMA single carrier, frequency division multiple access
 S-GW serving gateway
 TDD time division duplex
 UE user equipment
 UL uplink (UE towards eNB)
 UTRAN universal terrestrial radio access network A communication system known as evolved UTRAN (E-UTRAN, also referred to as UTRAN-LTE or as E-UTRA) is currently under development within the 3GPP. As presently specified the DL access technique will be OFDMA, and the UL access technique will be SC-FDMA.

One specification of interest is 3GPP TS 36.300, V8.4.0 (2008-03), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8). One section of particular relevance to the ensuing discussion is Section 5.2, Uplink Transmission Scheme.

FIG. 1 reproduces FIG. 4.1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:
 functions for Radio Resource Management: Radio Bearer Control, Radio Admission Control, Connection Mobility Control, Dynamic allocation of resources to UEs in both uplink and downlink (scheduling);
  IP header compression and encryption of user data stream;
  selection of a MME at UE attachment;
  routing of User Plane data towards Serving Gateway;
  scheduling and transmission of paging messages (originated from the MME);
  scheduling and transmission of broadcast information (originated from the MME or O&M); and
  measurement and measurement reporting configuration for mobility and scheduling.

Also of interest herein are the Layer 1 (PHY) specifications, such as those found in 3GPP TS 36.211 V8.2.0 (2008-03), 3rd Generation Partnership Project; Technical Specification Group Radio Access Network; Evolved Universal Terrestrial Radio Access (E-UTRA); Physical Channels and Modulation (Release 8), as well as 3GPP TS 36.213 V8.3.0 (2008-05), 3rd Generation Partnership Project; Technical Specification Group Radio Access Network; Evolved Universal Terrestrial Radio Access (E-UTRA); Physical Layer Procedures (Release 8).

Two different approaches have been discussed in 3GPP regarding the ACK/NACK signaling in TDD mode. A first approach can be referred to as ACK/NACK bundling (bundled-AN), where ACK/NACK feedback related to multiple DL sub-frames is compressed into a single ACK/NACK feedback transmitted via a single ACK/NACK resource. A second approach can be referred to as multi-ACK/NACK (multi-AN), where each DL subframe is considered as a separate HARQ process, and where a separate ACK/NACK feedback is transmitted for each (granted) DL subframe.

Of particular interest herein is the ACK/NACK bundling approach.

In R1-081110, "Multiple ACK/NACK for TDD", Ericsson, Motorola, Nokia, Nokia Siemens Networks, Qualcomm, it was agreed that DL hybrid ARQ (HARQ) acknowledgments in TDD can be transmitted as a single ACK/NACK feedback, where ACK/NACKs from one or several DL subframes are combined ("bundled" by performing an AND operation of all ANs) to a single ACK/NACK report. The PUCCH formats already defined for LTE are reused (PUCCH Format 1a/1b). This ACK/NACK mode has been referred to as "ACK/NACK-bundling" or more simply as "AN-bundling".

In R1-082168 and R1-082100, "ACK/NACK Bundling for TDD: Way Forward", Motorola, CATT, CMCC, Ericsson, Huawei, LGE, Qualcomm, Samsung, Texas Instruments, it was agreed regarding AN bundling for UL/DL configurations (except configuration 5) that a 2-bit Downlink Assignment Index field is added to DCI formats 1, 1A, 1B, 2. The Downlink Assignment Index must be greater than or equal to the number of previously assigned subframes within the bundling window and must be less than or equal to the maximum number of dynamic assignments within the bundling window. It was also agreed that the UE uses the CCE index in a last received/detected dynamic DL assignment, as well as the subframe number, to check for missed DL assignments and to determine the UL ACK/NACK PUCCH index. It was also agreed that semi-persistent assignments are not counted in the Downlink Assignment Index.

In R1-082243, "CR for UL ACK/NACK procedure for TDD", Motorola, it was agreed that the UE determines the UL ACK/NACK PUCCH index based on the lowest CCE index and downlink subframe number of the last received/detected dynamic assignment (the exact formula to use when determining the UL ACK/NACK PUCCH index was left for future study).

AN bundling is used when there are more downlink subframes than uplink subframes per radio frame. With the agreements made thus far in 3GPP RAN1, each downlink subframe will have its unique PUCCH AN resources in association therewith, while the specified AN bundling feature will only require occupying a single PUCCH AN resource at a given time, regardless how many DL HARQ ANs have been "bundled" together. This implies that, for example, if the bundling window is 4 DL subframes, each UE will use only 1 out of the 4 reserved PUCCH AN resources, while the remaining 3 PUCCH AN resources will be unused. As can be appreciated, this approach is wasteful when UL resources are scarce. This is particularly true, given the fact that UL is already in short supply when AN-bundling is applied (DL subframes>UL subframes).

R1-081816, "CCE to bundled ACK/NACK index mapping in TDD", LG Electronics, and R1-081788, "Uplink ACK/NACK implicit mapping in TDD", Huawei, partially address the PUCCH resource usage, but not the over-reservation per UE issue.

SUMMARY

The below summary section is intended to be merely exemplary and non-limiting.

The foregoing and other problems are overcome, and other advantages are realized, by the use of various exemplary embodiments of this invention.

In a first aspect thereof the exemplary embodiments of this invention provide a method for controlling channel signaling between a mobile user device (e.g., a UE) and a wireless network access node (e.g., a base station), where the method includes determining whether an examined sub-frame of a plurality of sub-frames in a first resource region is unused. The index of the examined sub-frame is a last index of the plurality of sub-frames allocated for use in a first channel. The plurality of sub-frames is organized in a reverse indexing manner such that a last indexed sub-frame is adjacent to a second resource region. The second resource region is allocated to a second channel. In response to determining that the examined sub-frame is unused, the examined sub-frame is re-allocated for temporary use in the second channel. The method also includes providing an indication of the allocation.

In a further aspect thereof the exemplary embodiments of this invention provide an apparatus for controlling channel signaling between a mobile user device (e.g., a UE) and a wireless network access node (e.g., a base station), where the apparatus includes at least one processor, and at least one memory storing computer program code. The at least one memory and the computer program code are configured to, with the at least one processor, cause the apparatus to perform at least the following: determine whether an examined sub-frame of a plurality of sub-frames in a first resource region is unused, where the index of the examined sub-frame is a last index of the plurality of sub-frames allocated for use in a first channel, where the plurality of sub-frames are organized in a reverse indexing manner such that a last indexed sub-frame is adjacent to a second resource region, and where the second resource region is allocated to a second channel; re-allocate the examined sub-frame for temporary use in the second channel in response to determining that the examined sub-frame is unused; and provide an indication of the allocation In an additional aspect thereof the exemplary embodiments of this invention provide a computer readable medium tangibly encoded with a computer program executable by a processor to perform actions for controlling channel signaling between a mobile user device (e.g., a UE) and a wireless network access node (e.g., a base station), where the actions include determining whether an examined sub-frame of a plurality of sub-frames in a first resource region is unused. The index of the examined sub-frame is a last index of the plurality of sub-frames allocated for use in a first channel. The plurality of sub-frames is organized in a reverse indexing manner such that a last indexed sub-frame is adjacent to a second resource region. The second resource region is allocated to a second channel. In response to determining that the examined sub-frame is unused, the examined sub-frame is re-allocated for temporary use in the second channel. The actions also include providing an indication of the allocation.

In a further aspect thereof the exemplary embodiments of this invention provide an apparatus for controlling channel signaling between a mobile user device (e.g., a UE) and a wireless network access node (e.g., a base station), where the apparatus includes means for determining whether an examined sub-frame of a plurality of sub-frames in a first resource region is unused. The index of the examined sub-frame is a last index of the plurality of sub-frames allocated for use in a first channel. The plurality of sub-frames is organized in a reverse indexing manner such that a last indexed sub-frame is adjacent to a second resource region. The second resource region is allocated to a second channel. Means for is re-allocating the examined sub-frame for temporary use in the second channel in response to determining that the examined sub-frame is unused are also included. The apparatus includes means for providing an indication of the allocation.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Reference may be had to 3GPP TSG RAN WG1 Meeting #52bis, R1-08xxxx, "Managing PUCCH for ACK/NACK bundling in LTE TDD", Shenzhen, China, Mar. 31 B Apr. 4, 2008, Nokia Siemens Networks, Nokia. In this approach PUCCH AN resources are compressed by mapping many DL CCE used for carrying the DL grants for same UE into a single PUCCH AN resource. This technique avoids the over-reservation problem, i.e., only a single AN resource is reserved per UE. It can be noted in this regard that the hashing functions described in 3GPP TS 36.213 for defining the UE specific search space will cause a randomization of the starting points for a given UE at a given aggregation level. As a result, it becomes important to properly account for which resources are being blocked by other UEs having already reserved PUCCH AN resources.

Figure 2:
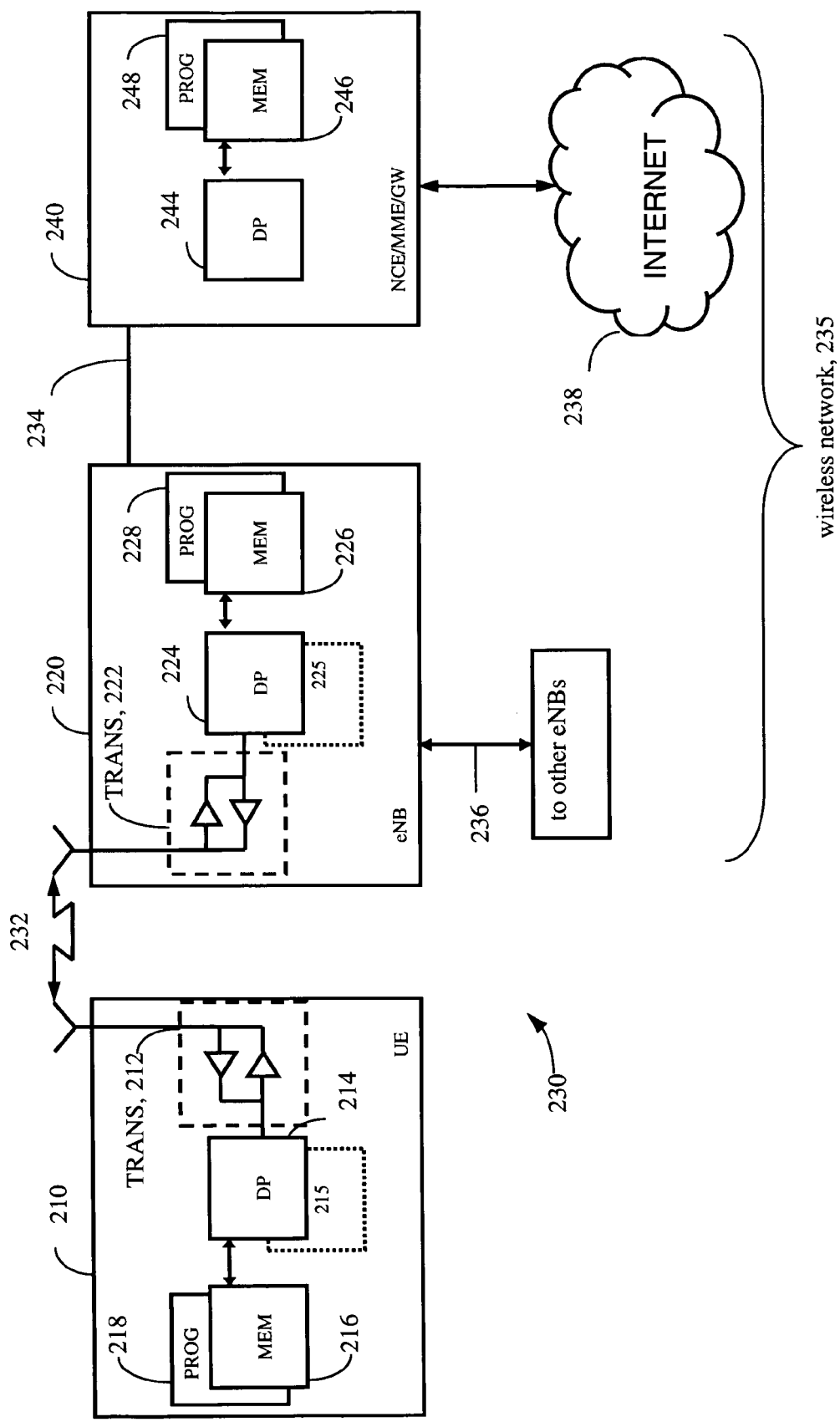
FIG. 2 shows a simplified block diagram of various electronic devices that are suitable for use in practicing exemplary embodiments of this invention.

Before describing in further detail various exemplary embodiments of this invention, reference is made to FIG. 2 for illustrating a simplified block diagram of various electronic devices and apparatus that are suitable for use in practicing exemplary embodiments of this invention.

Figure 1:
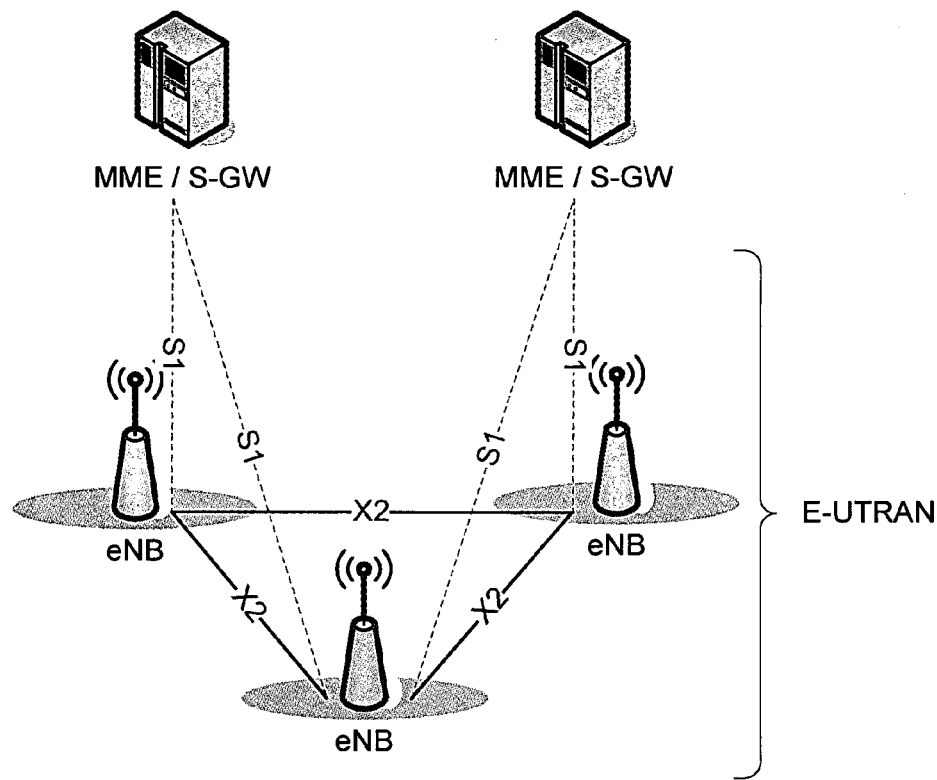
FIG. 1 reproduces FIG. 4 of 3GPP TS 36.300, and shows the overall architecture of the E-UTRAN system.

In the wireless system 230 of FIG. 2, a wireless network 235 is adapted for communication over a wireless link 232 with an apparatus, such as a mobile communication device which may be referred to as a UE 210, via a network access node, such as a Node B (base station), and more specifically an eNB 220. The network 235 may include a network control element (NCE) 240 that may include the MME/S GW functionality shown in FIG. 1, and which provides connectivity with a network, such as a telephone network and/or a data communications network (e.g., the internet 238).

The UE 210 includes a controller, such as a computer or a data processor (DP) 214, a computer-readable memory medium embodied as a memory (MEM) 216 that stores a program of computer instructions (PROG) 218, and a suitable radio frequency (RF) transceiver 212 for bidirectional wireless communications with the eNB 220 via one or more antennas.

The eNB 220 also includes a controller, such as a computer or a data processor (DP) 224, a computer-readable memory medium embodied as a memory (MEM) 226 that stores a program of computer instructions (PROG) 228, and a suitable RF transceiver 222 for communication with the UE 210 via one or more antennas. The eNB 220 is coupled via a data/control path 234 to the NCE 240. The path 234 may be implemented as the S1 interface shown in FIG. 1. The eNB 220 may also be coupled to another eNB via data/control path 236, which may be implemented as the X2 interface shown in FIG. 1.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 214 of the UE 210; by the DP 224 of the eNB 220; and/or by the DP 244 of the eNB 240, or by hardware, or by a combination of software and hardware (and firmware).

The UE 210 and the eNB 220 may also include dedicated processors, for example control channel signaling module 215 and control channel signaling module 225.

In general, the various embodiments of the UE 210 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples.

Figure 3A:
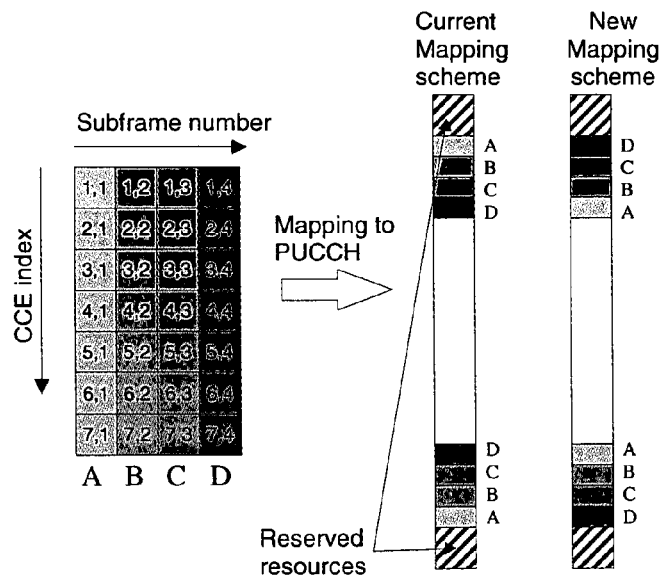
FIG. 3A shows a mapping scheme in accordance with this invention (new mapping scheme) contrasted with the conventional mapping scheme, where the new mapping scheme makes it possible to release resources for UL transmission in a case where possibly extensive use of AN bundling is employed.

Various exemplary embodiments of this invention provide at least one general principle to be applied to certain PUCCH mapping schemes. The general principle may be stated as: "The PUCCH ACK/NACK channel at the edge of the PUCCH region should be associated with the DL CCEs in the last/latest received DL subframe". One example to illustrate the application of this principle is shown in FIG. 3A. From FIG. 3A it is seen that with the use of reverse indexing as a function of subframe number, the last subframe is caused to address the outermost PRBs, thereby leaving more UL resources for PUSCH transmission.

One benefit of this approach is that the PUCCH resources that are non-used will be adjacent to the normal UL resources for UL transmission (PUSCH). Since UL allocations address adjacent frequency resources, this method is particularly efficient, as the fragmentation of the UL frequency band is minimized.

Figure 3B:
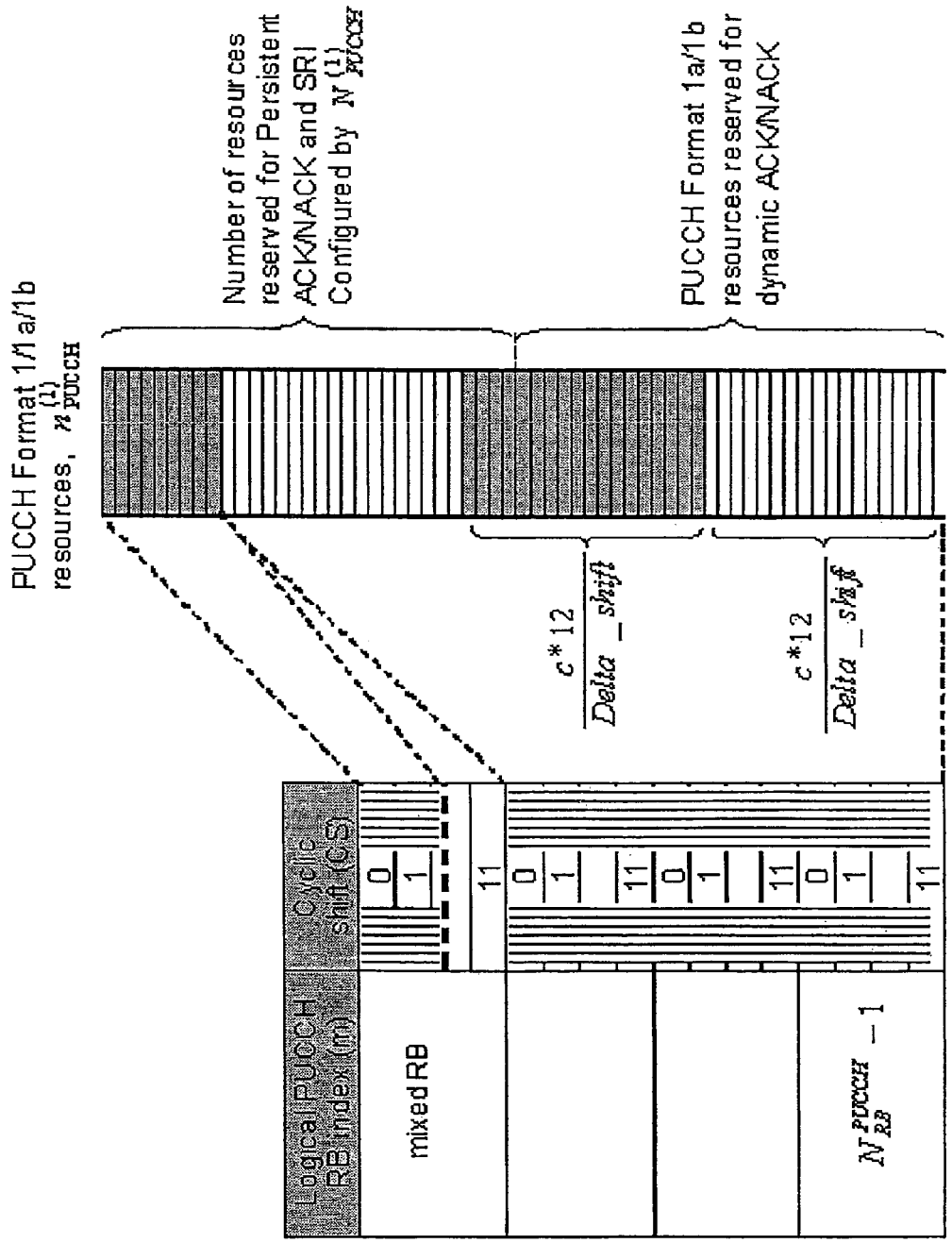
FIG. 3B shows a logical PUCCH RB index, CS and PUCCH resources for Format 1/1a/1b, which is useful in explaining exemplary embodiments in accordance with this invention.

It can be pointed out that one might assume that PDCCHs of each DL subframe are mapped into different PUCCH RBs. In practice, all the PUCCH Format 1/1a/1b resources share a common space (as shown in FIG. 3B). The RB-split and channelization are separate issues as compared to implicit mapping, that is, the RB-split is defined by the number of ACK/NACK resources available per RB. In any case, in accordance with these exemplary embodiments the last PUCCH Format 1a/1b resources are arranged into the innermost PUCCH RB and, as a result, most of the UEs 10 are transmitting ACK/NACK in these resources.

In a case of a 4 DL:1 UL configuration, there are 4 DL subframes per bundling window, and each DL subframe has some number of associated unique PUCCH AN channels in the single UL subframes. Thus, there are 4 PUCCH sub-regions (R_0 to R_3) each containing the PUCCH AN channels for HARQ of each DL subframe. The PUCCH sub-region (R_0) closest to the edge of the system bandwidth is associated with the CCEs from the last DL subframe in the bundling window. The sub-region next to R_0 (R_1) is associated with the CCEs from the second to last DL subframe in the bundling window. The sub-regions R_2 and R_3 are associated with the CCEs from the third to last DL subframe and the first DL subframe in the bundling window, respectively. In this manner the PUCCH resources reserved for the CCEs from the first DL subframe are closest to the center of the system bandwidth, i.e., adjacent to the PUSCH data channel. Due to the single carrier property of LTE UL multiple access scheme (SC-FDMA), the resources R_3 can be allocated together with the adjacent PUSCH PRBs if there is no DL grant in the first DL subframe, serving as the "last" DL grant in the bundling window. Similarly, both R_3 and R_2 can be allocated for data transmission if there is no DL grant in the first and second DL subframes, serving as the last DL grant in the bundling window.

Another benefit of the use of the illustrated "reverse" mapping, where the CCE from the last DL subframe is at the beginning of PUCCH region (i.e., closer to the edge of system bandwidth) while the CCEs from the first DL subframe are at the end of the PUCCH region (i.e., closer to the center of the system bandwidth), is that the PUCCH resources reserved for each DL subframe can be established exactly as specified according to the PCFICH value, as opposed to having to always reserve the maximum resources in the case where the mapping is from the first to last DL subframe. As a result, the PUCCH resources can be reserved more efficiently.

The foregoing principle as described above is preferably taken into consideration when defining the exact PUCCH AN indexing equation for 3GPP RAN1 36.213.

Figure 4:
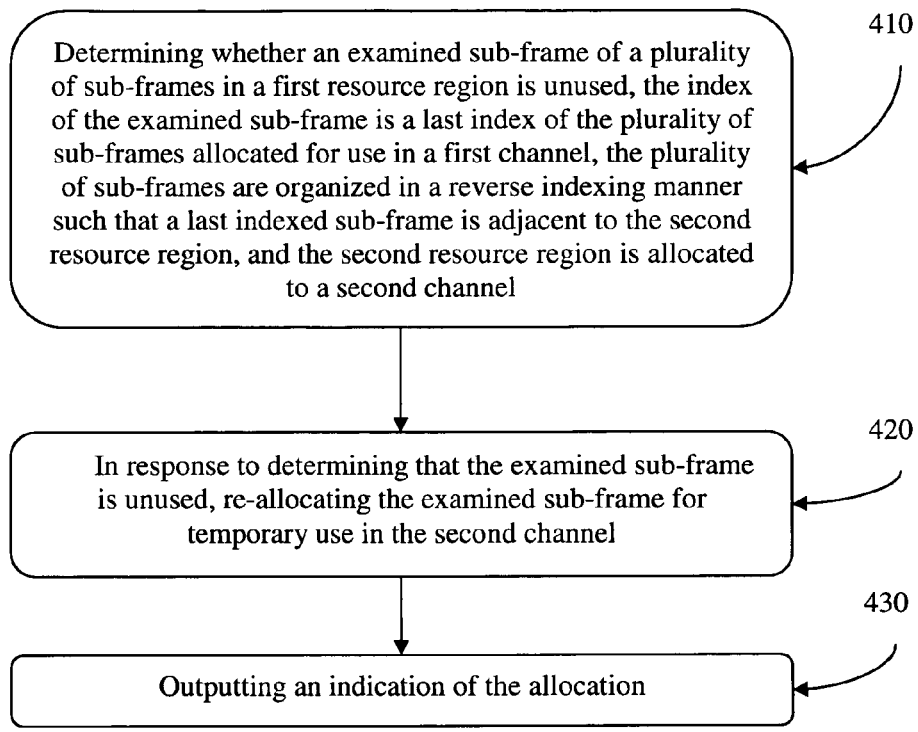
FIG. 4 is a logic flow diagram that illustrates the operation of an exemplary method, and a result of execution of computer program instructions embodied on a computer readable memory, in accordance with exemplary embodiments of this invention.

FIG. 4 is a logic flow diagram that illustrates the operation of a method, and a result of execution of computer program instructions, in accordance with various exemplary embodiments of this invention. In accordance with these exemplary embodiments a method performs, at Block 410, a step of determining whether an examined sub-frame of a plurality of sub-frames in a first resource region is unused. The index of the examined sub-frame is a last index of the plurality of sub-frames allocated for use in a first channel. The plurality of sub-frames is organized in a reverse indexing manner such that a last indexed sub-frame is adjacent to the second resource region. The second resource region is allocated to a second channel. At Block 420, a step of re-allocating the examined sub-frame for temporary use in the second channel is performed in response to determining that the examined sub-frame is unused. Providing an indication of the allocation is performed at Block 430 (for example by outputting the indication and/or transmitting the indication).

Figure 5:
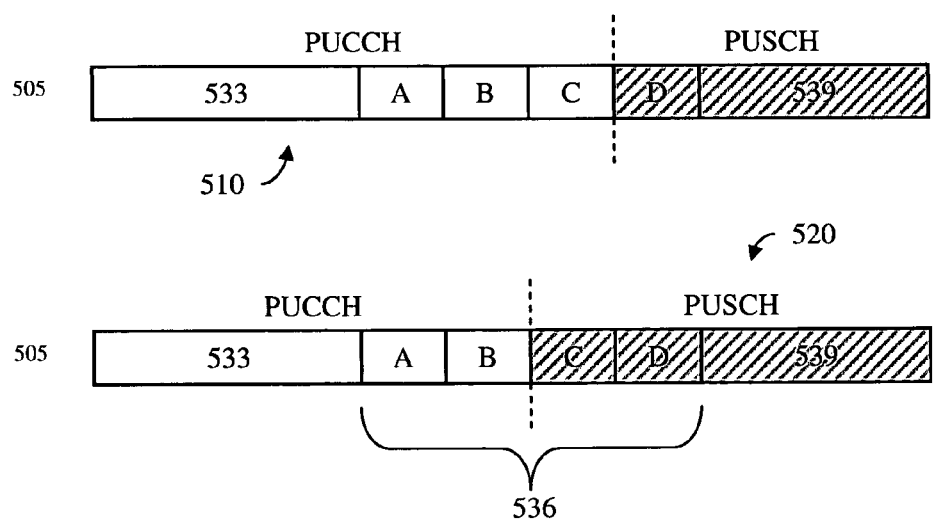
FIG. 5 illustrates a resource allocation in accordance with exemplary embodiments of this invention.

FIG. 5 illustrates a resource allocation in accordance with exemplary embodiments of this invention. Resource 505, which may represent frequency or time, is divided into multiple regions, for example, regions 533, 536 and 539. Regions are said to be adjacent if the combination of the two regions is contiguous (for example, an undivided block of time or frequencies). Thus, region 533 is adjacent to region 536 and region 536 is adjacent to region 539, however, region 533 is not adjacent to region 539. Region 536 is further divided into sub-frames A, B, C and D. Here, A is the first indexed sub-frame and D is the last indexed sub-frame.

The regions may be allocated to separate channels, for example, a PUCCH and a PUSCH. As shown in allocation 510, region 533 and sub-frames A, B and C are allocated for a PUCCH and region 539 and sub-frame D are allocated for a PUSCH. The dashed line represents the boundary between the two channels.

In accordance with a re-allocation, such as that described in FIG. 4 where sub-frame C is unused in allocation 510, allocation 520 shows the new allocation where sub-frame C is re-allocated for use in the PUSCH. The resulting allocation is as follows: region 533 and sub-frames A and B are allocated for the PUCCH and region 539 and sub-frames C and D are allocated for the PUSCH.

The various blocks shown in FIG. 4 may be viewed as method steps, and/or as operations that result from operation of computer program code, and/or as a plurality of coupled logic circuit elements constructed to carry out the associated function(s).

Based on the foregoing it should be apparent that various exemplary embodiments of this invention provide a method, apparatus and computer program(s) to provide a principle for use with ACK/NACK bundling. The method includes, in one embodiment, establishing a PUCCH ACK/NACK channel at the edge of the PUCCH region so as to be associated with DL CCEs in a last/latest received DL subframe, where as a result of reverse indexing as a function of subframe number a last subframe is caused to address outermost PRBs, thereby conserving UL resources for PUSCH transmission.

An exemplary embodiment in accordance with this invention is a method for controlling channel signaling between a mobile user device (e.g., a UE) and a wireless network access node (e.g., a base station), where the method includes determining whether an examined sub-frame of a plurality of sub-frames in a first resource region is unused. The index of the examined sub-frame is a last index of the plurality of sub-frames allocated for use in a first channel. The plurality of sub-frames is organized in a reverse indexing manner such that a last indexed sub-frame is adjacent to a second resource region. The second resource region is allocated to a second channel. In response to determining that the examined sub-frame is unused, the examined sub-frame is re-allocated for temporary use in the second channel. The method also includes providing an indication of the allocation.

In a further embodiment of the method above, the first channel is a PUCCH and the second channel is a PUSCH.

In an additional embodiment of any one of the methods above, the first channel is used at least in part for PUCCH AN transmission.

In a further embodiment of any one of the methods above, the first channel is used at least in part for transmission of DL CCEs. One or more sub-frame of the plurality of sub-frames may be allocated for use in AN-bundling transmission.

In an additional embodiment of any one of the methods above, the second channel is used at least in part for PUSCH data transmission.

In a further embodiment of any one of the methods above, the examined sub-frame is a first examined sub-frame and the method further includes determining whether a second examined sub-frame is to be used in the first channel, where the index of the second examined sub-frame is a first index of one or more sub-frame of the plurality of sub-frames allocated for use in the second channel, and in response to determining that the second examined sub-frame is to be used in the first channel, re-allocating the second examined sub-frame for use in the first channel.

In an additional embodiment of any one of the methods above, a sub-frame is a PRB.

In a further embodiment of any one of the methods above, the first resource region is adjacent to a second resource region.

An additional exemplary embodiment in accordance with this invention is an apparatus for controlling channel signaling between a mobile user device (e.g., a UE) and a wireless network access node (e.g., a base station), where the apparatus includes at least one processor, and at least one memory storing computer program code. The at least one memory and the computer program code are configured to, with the at least one processor, cause the apparatus to perform at least the following: determine whether an examined sub-frame of a plurality of sub-frames in a first resource region is unused, where the index of the examined sub-frame is a last index of the plurality of sub-frames allocated for use in a first channel, where the plurality of sub-frames are organized in a reverse indexing manner such that a last indexed sub-frame is adjacent to a second resource region, and where the second resource region is allocated to a second channel; re-allocate the examined sub-frame for temporary use in the second channel in response to determining that the examined sub-frame is unused; and provide an indication of the allocation In a further embodiment of the apparatus above, the first channel is a PUCCH and the second channel is a PUSCH.

In an additional embodiment of any one of the apparatus above, the first channel is used at least in part for PUCCH AN transmission.

In a further embodiment of any one of the apparatus above, the first channel is used at least in part for transmission of DL CCEs. One or more sub-frame of the plurality of sub-frames may be allocated for use in AN-bundling transmission.

In an additional embodiment of any one of the apparatus above, the second channel is used at least in part for PUSCH data transmission.

In a further embodiment of any one of the apparatus above, the examined sub-frame is a first examined sub-frame and at least one memory and the computer program code are configured to, with the at least one processor, also cause the apparatus to perform the following: determine whether a second examined sub-frame is to be used in the first channel, where the index of the second examined sub-frame is a first index of one or more sub-frame of the plurality of sub-frames allocated for use in the second channel, and in response to determining that the second examined sub-frame is to be used in the first channel, re-allocate the second examined sub-frame for use in the first channel.

In an additional embodiment of any one of the apparatus above, a sub-frame is a PRB.

In a further embodiment of any one of the apparatus above, the first resource region is adjacent to a second resource region.

In an additional embodiment of any one of the apparatus above, the apparatus also includes a transmitter configured to transmit the indication of the allocation.

A further exemplary embodiment in accordance with this invention is a computer readable medium tangibly encoded with a computer program executable by a processor to perform actions for controlling channel signaling between a mobile user device (e.g., a UE) and a wireless network access node (e.g., a base station), where the actions include determining whether an examined sub-frame of a plurality of sub-frames in a first resource region is unused. The index of the examined sub-frame is a last index of the plurality of sub-frames allocated for use in a first channel. The plurality of sub-frames is organized in a reverse indexing manner such that a last indexed sub-frame is adjacent to a second resource region. The second resource region is allocated to a second channel. In response to determining that the examined sub-frame is unused, the examined sub-frame is re-allocated for temporary use in the second channel. The actions also include providing an indication of the allocation.

In a further embodiment of the computer readable medium above, the first channel is a PUCCH and the second channel is a PUSCH.

In a further embodiment of any one of the computer readable media above, the first channel is used at least in part for PUCCH AN transmission.

In an additional embodiment of any one of the computer readable media above, the first channel is used at least in part for transmission of DL CCEs. One or more sub-frame of the plurality of sub-frames may be allocated for use in AN-bundling transmission.

In a further embodiment of any one of the computer readable media above, the second channel is used at least in part for PUSCH data transmission.

In an additional embodiment of any one of the computer readable media above, the examined sub-frame is a first examined sub-frame and the actions further include determining whether a second examined sub-frame is to be used in the first channel, where the index of the second examined sub-frame is a first index of one or more sub-frame of the plurality of sub-frames allocated for use in the second channel, and in response to determining that the second examined sub-frame is to be used in the first channel, re-allocating the second examined sub-frame for use in the first channel.

In a further embodiment of any one of the computer readable media above, a sub-frame is a PRB.

In an additional embodiment of any one of the computer readable media above, the first resource region is adjacent to a second resource region.

A further exemplary embodiment in accordance with this invention is an apparatus for controlling channel signaling between a mobile user device (e.g., a UE) and a wireless network access node (e.g., a base station), where the apparatus includes means for determining whether an examined sub-frame of a plurality of sub-frames in a first resource region is unused. The index of the examined sub-frame is a last index of the plurality of sub-frames allocated for use in a first channel. The plurality of sub-frames is organized in a reverse indexing manner such that a last indexed sub-frame is adjacent to a second resource region. The second resource region is allocated to a second channel. Means for is re-allocating the examined sub-frame for temporary use in the second channel in response to determining that the examined sub-frame is unused are also included. The apparatus includes means for providing an indication of the allocation.

In an additional embodiment of the apparatus above, the first channel is a PUCCH and the second channel is a PUSCH.

In a further embodiment of any one of the apparatus above, the first channel is used at least in part for PUCCH AN transmission.

In an additional embodiment of any one of the apparatus above, the first channel is used at least in part for transmission of DL CCEs. One or more sub-frame of the plurality of sub-frames may be allocated for use in AN-bundling transmission.

In a further embodiment of any one of the apparatus above, the second channel is used at least in part for PUSCH data transmission.

In an additional embodiment of any one of the apparatus above, the examined sub-frame is a first examined sub-frame and the apparatus also includes means for determining whether a second examined sub-frame is to be used in the first channel, where the index of the second examined sub-frame is a first index of one or more sub-frame of the plurality of sub-frames allocated for use in the second channel, and means for re-allocating the second examined sub-frame for use in the first channel in response to determining that the second examined sub-frame is to be used in the first channel.

In a further embodiment of any one of the apparatus above, a sub-frame is a PRB.

In an additional embodiment of any one of the apparatus above, the first resource region is adjacent to a second resource region.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of exemplary embodiments of this invention may be illustrated and described as block diagrams or by using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of various exemplary embodiments of the inventions may be practiced in various components such as integrated circuit chips and modules. It should thus be appreciated that exemplary embodiments of this invention may be realized in an apparatus that is embodied in whole or in part as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with various exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while various exemplary embodiments have been described above in the context of the EUTRAN (UTRAN-LTE) system (TDD) mode, it should be appreciated that exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters, channels and the like (e.g., CCE, PUCCH, PUSCH, PCFICH, etc.) are not intended to be limiting in any respect, as these parameters and channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   Determining, by at least one processor, whether an examined sub-frame of a plurality of sub-frames in a first resource region is unused,
   where the index of the examined sub-frame is a last index of the plurality of sub-frames allocated for use in a first channel,
   where the plurality of sub-frames are organized in a reverse indexing manner such that a last indexed sub-frame is adjacent to a second resource region, and
   where the second resource region is allocated to a second channel;
   in response to determining that the examined sub-frame is unused, re-allocating, by the at least one processor, the examined sub-frame for temporary use in the second channel; and
   providing an indication of the allocation by the at least one processor.

2. The method of claim 1, where the first channel is a physical uplink control channel and the second channel is a physical uplink shared channel.

3. The method of claim 1, where the first channel is used at least in part for physical uplink control channel acknowledge/negative-acknowledge transmission.

4. The method of claim 1, where the first channel is used at least in part for transmission of downlink control channel elements.

5. The method of claim 4, where at least one sub-frame of the plurality of sub-frames, is allocated for use in acknowledge/negative-acknowledge bundling transmission.

6. The method of claim 1, where the second channel is used at least in part for physical uplink shared channel data transmission.

7. The method of claim 1, where the examined sub-frame is a first examined sub-frame and further comprising:
   Determining, by the at least one processor, whether a second examined sub-frame is to be used in the first channel,
   where the index of the second examined sub-frame is a first index of at least one sub-frame of the plurality of sub-frames allocated for use in the second channel, and
   in response to determining that the second examined sub-frame is to be used in the first channel, re-allocating, by the at least one processor, the second examined sub-frame for use in the first channel.

8. The method of claim 1, where a sub-frame is a physical resource block.

9. The method of claim 1, where the first resource region is adjacent to a second resource region.

10. An apparatus comprising:
   at least one processor; and
   at least one memory storing computer program code,
   the at least one memory and the computer program code configured to, with the at least one processor, cause the apparatus to perform at least the following:
   determine whether an examined sub-frame of a plurality of sub-frames in a first resource region is unused, where the index of the examined sub-frame is a last index of the plurality of sub-frames allocated for use in a first channel, where the plurality of sub-frames are organized in a reverse indexing manner such that a last indexed sub-frame is adjacent to a second resource region, and where the second resource region is allocated to a second channel;
   in response to determining that the examined sub-frame is unused, re-allocate the examined sub-frame for temporary use in the second channel; and
   provide an indication of the allocation.

11. The apparatus of claim 10, where the first channel is used at least in part for physical uplink control channel acknowledge/negative-acknowledge transmission.

12. The apparatus of claim 10, where the first channel is used at least in part for transmission of downlink control channel elements and where at least one sub-frame of the plurality of sub-frames, is allocated for use in acknowledge/negative-acknowledge bundling transmission.

13. The apparatus of claim 10, where the examined sub-frame is a first examined sub-frame and the at least one memory and the computer program code configured to, with the at least one processor, further cause the apparatus to perform the following:
   determine whether a second examined sub-frame is to be used in the first channel, where the index of the second examined sub-frame is a first index of at least one sub-frame of the plurality of sub-frames allocated for use in the second channel, and
   in response to determining that the second examined sub-frame is to be used in the first channel, re-allocate the second examined sub-frame for use in the first channel.

14. The apparatus of claim 10, further comprising a transmitter configured to transmit the indication of the allocation.

15. A computer program product comprising a non-transitory computer readable storage medium bearing computer program code embodied therein for use with a computer, the computer program code comprising:
   code for determining whether an examined sub-frame of a plurality of sub-frames in a first resource region is unused, where the index of the examined sub-frame is a last index of the plurality of sub-frames allocated for use in a first channel, where the plurality of sub-frames are organized in a reverse indexing manner such that a last indexed sub-frame is adjacent to a second resource region, and where the second resource region is allocated to a second channel;
   code for in response to determining that the examined sub-frame is unused, re-allocating the examined sub-frame for temporary use in the second channel; and
   code for providing an indication of the allocation.

16. The computer program product of claim 15, where the first channel is used at least in part for transmission of downlink control channel elements and where at least one sub-frame of the plurality of sub-frames, is allocated for use in acknowledge/negative-acknowledge bundling transmission.

17. The computer program product of claim 15, where the examined sub-frame is a first examined sub-frame and the computer code further comprises:
   code for determining whether a second examined sub-frame is to be used in the first channel, where the index of the second examined sub-frame is a first index of at least one sub-frame of the plurality of sub-frames allocated for use in the second channel, and
   code for, in response to determining that the second examined sub-frame is to be used in the first channel, re-allocating the second examined sub-frame for use in the first channel.

* * * * *